United States Patent [19]

Colbaugh et al.

[11] Patent Number: 4,815,845
[45] Date of Patent: Mar. 28, 1989

[54] AXIAL ALIGNMENT AID FOR REMOTE CONTROL OPERATIONS AND RELATED METHOD

[75] Inventors: Michael E. Colbaugh, Trafford; John J. Wilhelm, New Kensington, both of Pa.

[73] Assignee: Westinghouse Electric Corp., Pittsburgh, Pa.

[21] Appl. No.: 852,872

[22] Filed: Apr. 16, 1986

[51] Int. Cl.⁴ .............................................. G01B 11/00
[52] U.S. Cl. ...................................... 356/153; 356/399
[58] Field of Search ........................... 33/286; 244/161; 358/101, 125; 356/138, 153, 154, 399, 400, 401

[56] References Cited

U.S. PATENT DOCUMENTS

| | | |
|---|---|---|
| 1,538,991 | 5/1925 | Hill . |
| 2,352,179 | 6/1944 | Bolsey . |
| 3,254,560 | 6/1966 | Gottesmann . |
| 3,269,254 | 8/1966 | Cooper et al. . |
| 3,480,367 | 11/1969 | Husted et al. ........... 356/150 |
| 3,778,169 | 12/1973 | Adams .................. 356/172 |
| 3,801,205 | 4/1974 | Eggenschwyler ........... 356/138 |
| 4,012,148 | 3/1977 | Marantette et al. ......... 356/172 |
| 4,130,361 | 12/1978 | Humphrey ............... 356/125 |
| 4,191,471 | 3/1980 | Courten et al. ........... 356/154 |
| 4,295,740 | 10/1981 | Sturges, Jr. ............. 356/152 |
| 4,316,189 | 2/1982 | Sturges, Jr. ............. 340/870.34 |
| 4,395,005 | 7/1983 | Ganssle ................ 244/161 |
| 4,452,532 | 6/1984 | Grollimund et al. ....... 356/121 |

FOREIGN PATENT DOCUMENTS

| | | |
|---|---|---|
| 1155781 | 6/1969 | United Kingdom . |
| 1286421 | 8/1972 | United Kingdom . |
| 2165957A | 4/1986 | United Kingdom . |

OTHER PUBLICATIONS

Communications, Tracking and Docking on the Space Station; IEEE; Nov. 8, 9, 10, 1982, Nat'l Telesystems Conf. (Galveston, TX).
Brochure for Sony, Miniature Camera Unit HVM-32.
British Search Report dated Jun. 5, 1987.

Primary Examiner—F. L. Evans

[57] ABSTRACT

An axial alignment aid for remote control operations and related method are provided. A mirror located on a first movable member gathers light from its field of view in front of the first member and reflects it at right angles to a beam splitter which reflects the light at right angles to a video camera on the first member. A laser, also on the first member, projects a thin beam of light through a beam expander and a beam-expander lens template which gives the projected beam a pattern. The beam then reflects off another mirror, passes through the beam-splitter and is reflected off the original mirror. The beam is then projected on-axis with the first member (coincidentally on-axis with the video camera's field of view), and is inverted to match the original pattern. A reflective visual indicator or target is mounted on a second member so that its optical axis is collinear with the axis of the second member. An off-axis rotation of the first member to the right of the operator's perspective will result in a back-projected laser spot to the right of center on the visual indicator's front surface. On the other hand, rotation of the first member to the left of the operator's perspective will cause the spot to appear to the left of center on the front surface. Finally, if the operator centers the back-projected spot on the front surface of the visual indicator by moving the first member via a feedback control circuit, the laser light will be reflected exactly on axis with the center of the visual indicator. Positive indication of precise alignment of the first and second members is thus achieved and the first member can be safely and accurately docked with the second member.

9 Claims, 4 Drawing Sheets

AXIAL ALIGNMENT AID FOR REMOTE CONTROL OPERATIONS AND RELATED METHOD

BACKGROUND OF THE INVENTION

This invention relates to a remote control apparatus and, more particularly, to an axial alignment aid and related method for facilitating remote control operations.

Many attempts have been made to remotely align two objects in space. For example, the National Aeronautics and Space Administration (NASA) has done extensive work in the area of docking spacecraft. As discussed in "Communications, Tracking and Docking on the Space Station," by Erwin et al., published by the Institute of Electrical and Electronics Engineers (1982), NASA has proposed the use of a triangular array of reflectors on a passive target to define a plane and facilitate docking of an active vehicle thereto. Sequential tracking of each reflector from the active vehicle in space allows altitude determination between the active vehicle and the passive target. However, this triangular reflector system necessarily employs computers, thus making it extremely complex. In addition, the system is incapable of accurately and remotely aligning an axis of importance of the passive target to an axis of importance of the active vehicle to allow "soft" docking.

Other attempts have been made to accurately align or dock one object relative to another. For example, U.S. Pat. No. 3,269,254, issued to COPPER et al., discloses an optical apparatus including: a light source; a beam splitting cube; a lens system and a grated mirror, all on one side of the light source; and a measuring reticle having coordinates thereon located on the opposite side of the light source. Light from the light source is directed by the beam splitting cube through the lens system. The light then reflects off of the mirror to again pass through the lens system and the beam splitting cube. Finally, an image is formed at the measuring reticle to provide information regarding orientation of a body o which the mirror is attached, as defined by azimuth, pitch and roll. Because the mirror described in this patent is flat, if the beam of light directed at the mirror is too far off-axis, the light beam can be reflected too far off, thus preventing the formation of an image at the measuring reticle. As a result, an accurate off-axis measure is not available with this patented device. Further, this patented device is sensitive to distance, i.e., the effectiveness of the device is lessened as the measuring reticle and the mirror are placed farther apart. Finally, this device is not adapted to allow docking of one member relative to another member.

In addition, U.S. Pat. No. 2,352,179, issued to BOSLEY, uses a set of four photo-electric cells as detectors to provide information as to the orientation of a lens. That is, the set of cells indicates from one perspective how far away one is from a target; but such detectors cannot accurately indicate the axis that is defined by the target. Therefore, such a system using a set of four detectors is also incapable of allowing on-axis docking alignment of one object relative to another.

One application where remote control docking would be particularly important is in nuclear powered steam generators. For example, performing a task within the steam generator with a tool or end effector and a robot for receiving the end effector is currently performed as follows. A first set of cameras positioned in the steam generator allow a conventional robot arm known as ROSA (remote operation service arm) to be remotely viewed and moved to the general vicinity of one or several end effectors positioned in the steam generator. These cameras, however, cannot accurately and automatically align the respective axes of the chosen end effector and ROSA, i.e., cannot reliably effect docking and attachment.

The end effector also has a camera mounted thereon which ultimately is used to remotely view the worksite during performance of the task via a conventional feedback system using a remote viewing station, robotic controls and means for moving ROSA.

As a result, a man must be introduced into the steam generator to manually align and attach the end effector to ROSA. However, due to the potential radiation exposure, tedious alignment and attachment steps necessary, and the relatively heavy members being manipulated, it is desired to make the alignment and attachment of end effectors to ROSA in the steam generator an entirely remotely controlled operation having high reliability A more general need also exists for a means by which accurate alignment can be made between two important axes of respective docking members using single perspective visual guidance.

SUMMARY OF THE INVENTION

Accordingly, it is an object of the present invention to provide an axial alignment aid for remote control operations and a related method which are capable of quickly and efficiently aligning the axis of a first movable member with an axis of a second member, thus facilitating accurate docking of the first member to the second member.

It is another object of the present invention to provide an axial alignment aid for remote control operations and a related method which provide a remote operator with a visual representation of the orientation of an axis of a first member relative to an axis of a second member and allow quick and accurate movement of the axis of the first member to be collinear with the axis of the second member, if necessary, just prior to docking.

It is also an object of the present invention to provide an axial alignment aid for remote control operations and a related method which are relatively simple in construction and steps, respectively, have application to a variety of docking operations, save man hours and improve worker safety, particularly when applied to a nuclear powered steam generator.

Finally, it is an object of the present invention to provide an axial alignment aid for a remote control robotic operation and related method which are capable of remotely aligning the axis of ROSA with an axis of an end effector within a nuclear powered steam generator, thus facilitating effective docking and attachment of the end effector to ROSA.

To achieve the foregoing and other objects of the present invention, and in accordance with the purposes of the invention there is provided an apparatus and related method which aid an operator, who is remotely controlling a first, movable member, to accurately align the first member with some important axis of a second, separate member. The apparatus for providing this assistance is visual in nature and includes primarily: (1) a remote camera/optic combination; and (2) a visual indicator.

The remote camera/optic combination includes a video camera and a laser mounted on the first, movable member. A mirror gathers light from its field of view in front of the first member and reflects it at right angles to a beam splitter. The light is then reflected at right angles again by the beam splitter and collected by the lens of the video camera. The laser projects a thin beam of light through a beam expander and a beam-expander lens template which gives the projected beam a well-defined and identifiable pattern, such as a cross-shape. The cross-shaped beam then reflects off another mirror, is attenuated, and passes through the beam-splitter. The beam continues on to and is reflected off of the original mirror toward the second member. The beam is projected on-axis with the first member, coincidentally on-axis with the video camera's field of view, and is inverted to match the original orientation of the beam-splitter lens template's pattern.

The visual indicator is mounted on the second member so that its optical axis is collinear with the axis of the second member. The visual indicator may be constructed as a hollow cylinder with internal walls which are non-reflective. A mirror is mounted on the inside/back surface of the cylinder, perpendicular to the cylinder's axis of symmetry. A front surface which consists primarily of light-diffusing material is mounted parallel to the mirror of the visual indicator. A small transparent window is built into the center of the front surface. A cross-shaped pattern is formed on the front surface, along with an index mark which enables centering and index alignment.

An off-axis rotation of the first member to the right of the operator's perspective will result in a back-projected laser spot to the right of center on the visual indicator's front surface. On the other hand, rotation of the first member to the left of the operator's perspective will cause the spot to appear to the left of center on the front surface. Finally, when the operator centers the back-projected spot on the front surface of the visual indicator by properly moving the first member, the laser light will be reflected exactly on axis with the projected cross-shape, in the opposite direction. This will cause the center of the visual indicator to appear brilliant when viewed through the video camera. Positive indication of precise alignment is thus achieved and the first member can be safely and accurately docked with the second member.

This relatively simple and inexpensive remotely controlled axial alignment aid and related method, therefore, allow accurate alignment to be made between two, separate, important axes using single perspective visual guidance. The apparatus and method are most valuable for remotely controlled automated equipment operations, including accurate mechanical docking, mating and actuation.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 4b is a side view of the convex planar spherical lens shown in FIG. 4a;

DETAILED DESCRIPTION OF THE PREFERRED EMBODIMENTS

Figure 1:
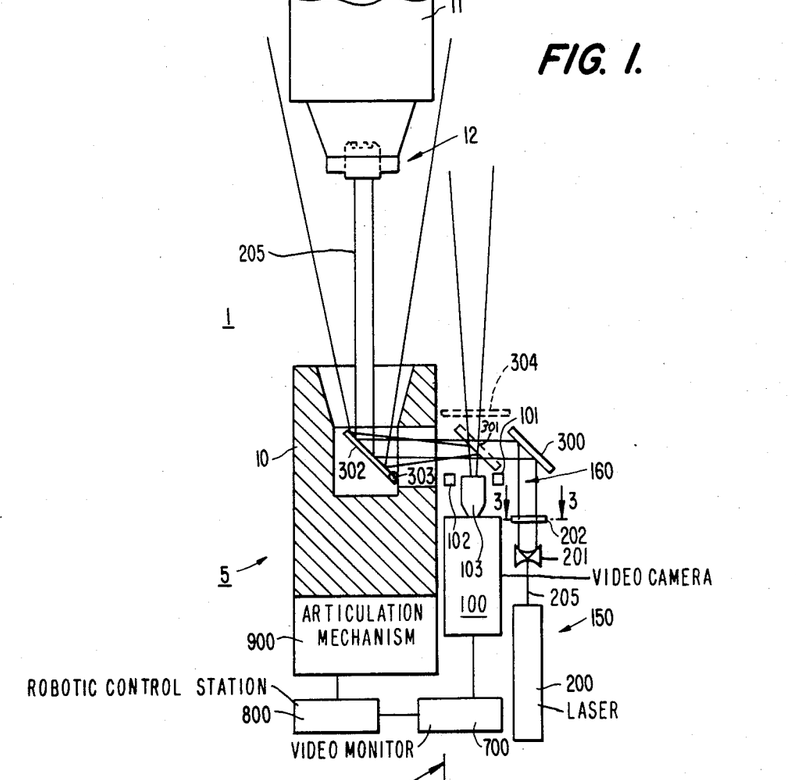
FIG. 1 is a schematic, partial, cross-sectional view of the remotely controlled axial alignment aid according to the present invention.

The axial alignment aid according to the present invention is illustrated schematically in FIG. 1 and is referred to generally by reference numeral 1. The axial alignment aid 1 is visual in nature and generally comprises two parts: a remote camera/optics combination 5; and a visual indicator 12.

Generally, the remote camera/optics combination 5 is strategically mounted on a remotely controlled, movable first member 10 to allow viewing of an operation with its field of view (or perspective) centered on an axis of a second member 11 which is important to the operation (e.g., a tool or end-effector actuation axis as will be discussed in detail hereafter). The visual indicator 12 is fixed to the second member 11 as a target and is aligned with an important physical axis of the second member 11. Alignment of the two independent axes of the first and second members 10 and 11, respectively, is important in any type of remote docking operation, or something as fundamental as starting a screw into a threaded hole. The simplicity of this invention makes its application appealing and inexpensive for a broad range of automated system uses, including human-controlled robotics, and fully automatic machine-vision operations.

More particularly, the remote camera/optics combination 5, including a video camera 100 and a first light source 150, such as a laser 200, is mounted on the first movable member 10 so that the video camera 100 has a clear view for the desired operation.

As shown in FIG. 1, the first member 10 is configured, for example, as a conically bored docking fixture intended to mate with the second member 11 configured, for example, as a conical male counterpart. A first mirror 302 gathers light from its field of view in front of the first member 10 and reflects it at right angles to a beam splitter 301. After being attenuated by at least 50% of its original intensity, the light is again reflected at right angles by the beam-splitter 301 and collected by the lens 103 of the video camera 100.

The first mirror 302 can be movable, via an articulation member 303 such as a hinge, spring or motor driven apparatus. Such an articulation member 303 would be used if the first mirror 302 is not placed far enough into the the first member 10 to avoid being damaged by the second member 11 during docking.

The light gathered by the first mirror 302 is either provided by ambient lighting or by a second light source 160. In the preferred embodiment, the second light source 160 includes an arrangement of illuminators, 101, 102 that project light in the opposite direction that the light is being gathered from, thus providing broad-field illumination centered on the field of view of the video camera 100.

A removable, light absorbing barrier 304, such as a black wall, may be placed on the side opposite the beam-splitter 301 from the video camera 100 to obstruct any interfering view that the video camera 100 might receive through the beam-splitter 301. By using such a barrier 304, the view of the video camera 100 can be temporarily limited to the alignment operational-perspective only.

Figure 3:
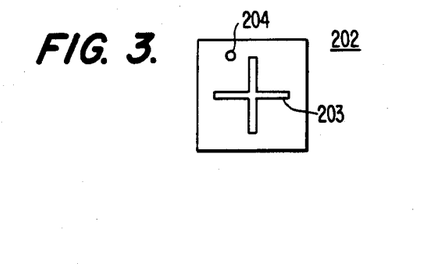
FIG. 3 is a view taken along line 3—3 of FIG. 1, illustrating particularly the beam expander lens template according to the present invention.

The laser 200 projects a thin beam of light 205 through a beam expander 201 and a beam-expander lens template 202 with a cross-shape 203 formed therein which gives the projected beam a well defined and identifiable cross-shaped pattern in the preferred embodiment, when it finally strikes a surface beyond fixture 10. FIG. 3 is an expanded view of the beam expander lens template 202 shown in FIG. 1. As seen, the template 202 also includes an index mark 204 which facilitates matching of the quadrants formed by the cross-shape 203 with the quadrants formed on the visual indicator 12 described below. FIG. 3 is an expanded view of the beam expander lens template 202 shown in FIG. 1.

From the template 202, the cross-shaped beam reflects off of a second mirror 300, is again attenuated, and passes through the beam-splitter 301. The beam continues on to and is reflected off of the first mirror 302. Finally, the beam is projected out from the first mirror 302 in the first member 10, on-axis with the first member 10, (coincidentally on-axis with the field of view of the video camera 100), and is corrected, i.e., inverted, to match the original orientation of the beam expander lens template's 202 pattern. The resulting projected cross-shape then provides a means for obtaining rotational alignment and establishing an intersection between the axes of the first and second members 10 and 11, as will now be discussed.

Figure 2:
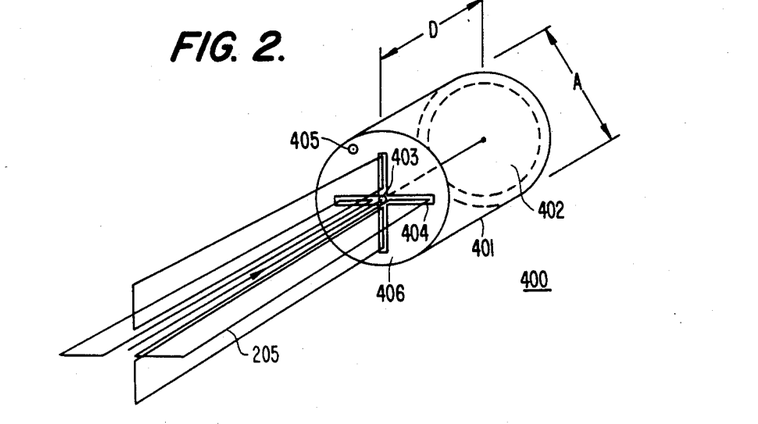
FIG. 2 is a perspective view of the preferred embodiment of the visual indicator according to the present invention.

The visual indicator 12 is responsible for removing off-angle error. One embodiment of the visual indicator 12 is shown in FIG. 2 and is indicated by reference numeral 400. This visual indicator 400 is mounted on the second member 11 so that its optical axis is collinear with the axis of the second member 11. This embodiment of the visual indicator 400 is constructed of a hollow cylinder 401, either formed by boring a hole in the surface of second member 11 or by fashioning an insert out of a cylindrical material Through experimentation it has been found that a cylinder 401 depth "D" to a cylinder 401 diameter "A" ratio of 1:1 yields favorble results. The internal walls of the cylinder 401 should be non-reflective. A third mirror 402 is mounted on the inside/back surface of the cylinder 401, perpendicular to the axis of symmetry of the cylinder 401. A front surface 406 is mounted parallel to the mirror 402 and is made primarily of light-diffusing material, e.g., a frosted surface. A small transparent window 403 is formed at the center of the front surface 406 in the form of a pin hole or clear insert. A cross-shaped pattern 404 is marked by etching or other conventional means onto the front surface 406, along with an index mark 405, which enable centering and index alignment.

The function of the visual indicator 400 is explained by reference to FIGS. 3a through 3c.

Figure 3A:
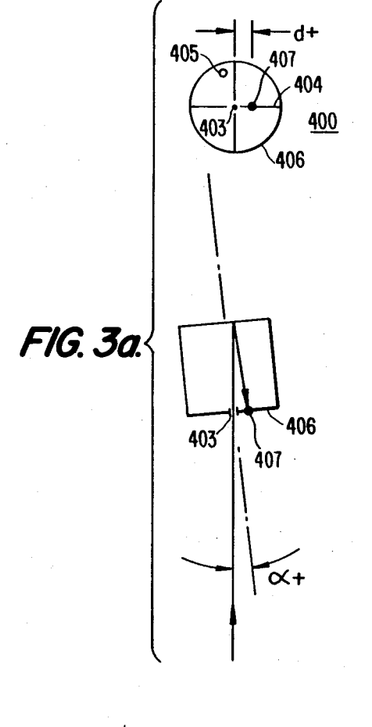
FIG. 3a is a schematic view of the visual indicator's function according to the present invention, illustrating particularly an off-axis representation.

FIG. 3a illustrates the first case of off-axis rotation $(d+)$ of the visual indicator 400 relative to the axis of the first member 10 to the right of the operator's perspective which will result in a back-projected spot 407 to the right of center $(\alpha+)$ on the front surface 406 of the visual indicator 400.

Figure 3B:
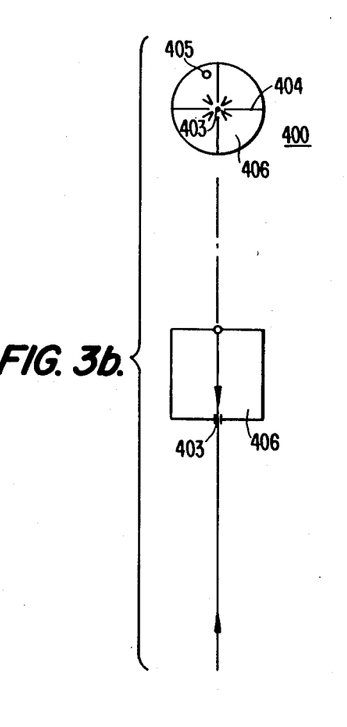
FIG. 3b is a schematic view of the visual indicator's function according to the present invention, illustrating particularly an on-axis representation.
Figure 3C:
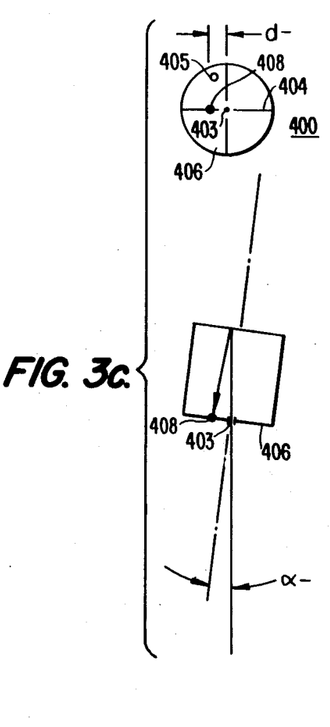
FIG. 3c is a schematic view of the visual indicator's function according to the present invention, illustrating particularly another off-axis representation.

On the other hand, FIG. 3c shows the second case of off-axis rotation $(d-)$ of the visual indicator 400 relative to the axis of the first member 10 to the left of the operator's perspective which will result in a back-projected spot 408 to the left of center $(\alpha-)$ on the front surface 406.

Finally, FIG. 3b illustrates the third case, wherein, the laser 200 light is reflected exactly on axis with the projected cross-shape, in the opposite direction. This will cause the center of the visual indicator 400 to appear brilliant when viewed through the video camera 100.

The laser 200 is conventional, such as a solid state or gas laser, and is included to provide a collimated and coherent light with which the axis of the fixture 10 is visually indicated. However, the first light source 150 can instead be a less expensive and less coherent collimated light source (e.g. incandescent lamp, light-emitting-diode, etc.). A cross-shape or other shape sighting structure must still be physically arranged in the path of view of the video camera 100. Such a second light source 160 must be optically aligned with the optical axis of the video camera 100 and within the focused range of the video camera 100. The light therefrom must also be bright enough to cause the desired effect with the visual indicator 12, as discussed below. In any case, a brilliant spot must be projected onto the first surface that the axis of the first member 10 intersects with, clearly marking the center of the field of view of the video camera 100 since these axes are coincident.

It is also to be noted that a cross-shaped beam is not absolutely necessary for proper functioning of the present invention. A cross-shape beam does facilitate finding the point at the center of the visual indicator 12 around which the first member 2 is rotated to create axial alignment, as is discussed below. A cross-shape also is beneficial with the preferred embodiment of the visual indicator 12, i.e., a cylinder with a mirror on the back thereof (FIG. 2). Another alignment pattern (other than the cross-shape pattern) may be used by appropriately designing the template 202, as long as it has a center illuminated portion. Another alignment pattern, for example, is a bull's eye pattern type.

The beam-expander 201 also is not necessary to proper functioning of the present invention. Of course, if deleted, the template 202 would also be deleted. The visual effect of the spot created with the cylinder type visual indicator 12, however, will not be as pronounced if these members 201 and 202 are deleted.

It is also to be understood that the positions of the video camera 100 and the laser related components 200, 201, 202 can be reversed. The laser 200 would then reflect off of the beam-splitter 301 and the video camera 100 would obtain its view off of the second mirror 300.

As described above, the preferred method of targeting is "on center," which is done by effectively making the video camera 100 look down the axis of the second member 11. However, the present invention also lends itself to having the video camera 100 looking at a target "off-center" by knowing where the axis of the first member 10 is in relation to the video camera 100 axis and introducing a moment kind of error which is a magnified error in regard to the rotational axis of the first member 10.

In addition, two axial alignment aids 1 could be used with a single target such that as each aid 1 comes into alignment as discussed above, a single point is defined in space.

As indicated above, the present invention has particular application to a steam generator. In a steam generator, ROSA is a powerful tool performing difficult tasks. As a result, the mating surfaces of ROSA and the end effectors must meet exacting dimensional tolerances. Thus, the important thing is not only to locate the end effector, but also to accurately align ROSA with the mating part of the end. effector to dock the end effector with the end of ROSA without damage. As a result, the critical goal is to be able to accurately line up the axis of ROSA with the axis of the end effector.

It currently takes approximately half an hour for a man to manually attach an end effector to ROSA as described above. It takes four seconds with the present invention, because the video camera 100 allows the operator to view the world at large and to control ROSA accurately to align and couple. As a result, the present invention eliminates the need for the conventional auxiliary camera on the end effector.

More particularly, each end effector would include a visual indicator 12 thereon. The visual indicator 12 would be mounted centrally or co-axially on the end effector, i.e., the axis you want to align to and also to a flat plane that is perpendicular to the axis. Preferably, a connecting means, such as epoxy, would be used to mount the visual indicator 12 on the end effector. Any other connecting means which is not affected by radiation would be suitable.

The video camera 100 is then focused on the visual indicator 12 after ROSA (which is the equivalent of the first movable member 10) moves into the vicinity of the end effector via the set of cameras conventionally arranged in the steam generator, as discussed above. Once there, the axial alignment aid 1 described above, is used to detect what, if any, off-axis orientation exists. If off-axis is seen on the visual indicator 12 .through the video camera 100 as shown in either of FIGS. 3a or 3c, ROSA must be moved until the visual indicator 12 indicates the on-axis condition shown in FIG. 3b, at which time a docking command is given to ROSA.

That is, once the operator detects that there is misalignment, a conventional control circuit allows the operator to move ROSA one way or another. As shown in FIG. 1, the control circuit includes a video monitor 700 electrically connected to the video camera 100 and a robotic control station 800 with a joystick (not shown) for controlling ROSA's two modes of operation, i.e., rotation or translation, via a conventional articulation mechanism 900. Once ROSA is aimed at a point in space, it can extend to that point based on 6 axes movement controlled by the known software package of the robotic control station 800 that the joystick controls.

The operator can simply move ROSA around until the two images match, as shown in FIG. 3b, and then the dock command is given and ROSA docks straight toward the target, i.e., the second member 11.

The present invention therefore provides a remote, human-control, visual feedback tool for use in a steam generator. As a result, there is no longer any need to have a man in the steam generator, thus improving worker safety. In addition, attachment is quicker, i.e., eye-hand coordination of the operator is immediate through definite feedback. Finally, the operation described above using an operator to compare the light spots and move ROSA can actually be performed by a computer, if desired.

FIGS. 4-8 illustrate alternate embodiments according to the present invention which will now be described.

Figure 4A:
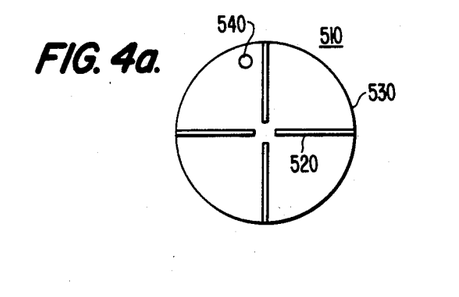
FIG. 4a is a front view of an alternate embodiment of the visual indicator according to the present invention, illustrating particularly a convex planar spherical lens.
Figure 4B:
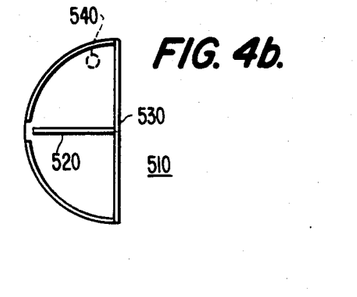

Instead of a cylindrical visual indicator 400, as described above in relation to FIGS. 2 and 3a-3c, a lens can be used as the visual indicator 12. For example, as shown in FIGS. 4a and 4b, a lens 510 can be used with a cross-shape 520 and an index mark 540 formed thereon, and a rear-mounted mirror 530. Thus, when a collimated light source strikes this lens 510, two bright spots can be seen with the video camera 100.

Figure 5:
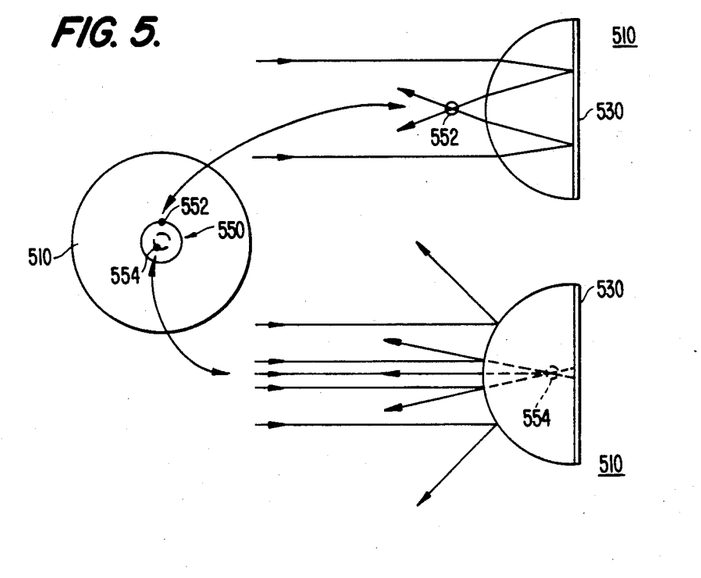
FIG. 5 is a schematic view illustrating the visual effect of the convex planar spherical lens shown in FIGS. 4a and 4b.

FIG. 5 is a schematic view illustrating the visual effect of the convex planar spherical lens 510 shown in FIGS. 4a and 4b. As shown in FIG. 5, a first reprojected spot 552 is formed by the refractive quality of the lens 510 and the reflective mirror 530. This spot 552 appears typically to "float" in space in front of the lens 510. The second spot 554 is a virtual image caused by the reflective properties of the front surface of the lens 510. As the ray tracings of FIG. 5 show, the second spot 554 will appear to be suspended within the lens 510 itself.

If the optical axis of the lens 510 is aligned with that of the video camera 100 shown in FIG. 1, the two spots 552 and 554 will appear to be superimposed as one spot 550. If the projected laser beam is centered and indexed s described earlier with the use of the cross-shape 520 and lens mark 540, accurate alignment will be achieved when the spots 552, 554 are superimposed to form a single spot 550.

Figure 6:
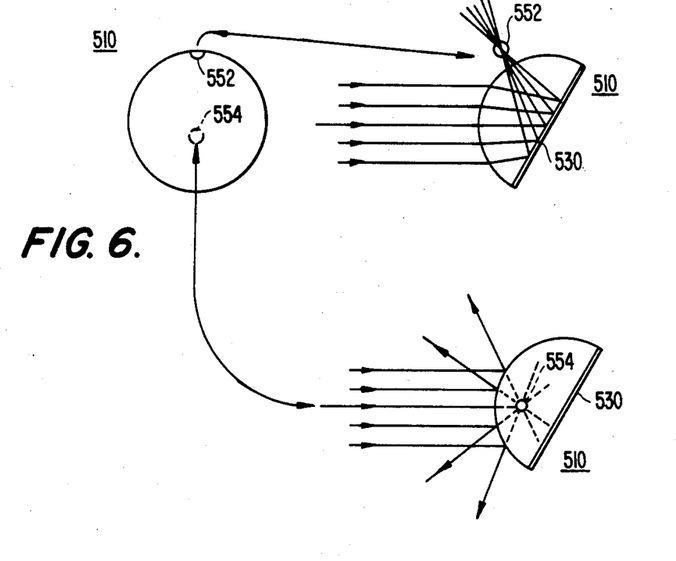
FIG. 6 is a schematic view illustrating off-axis, tilt visual effect of the visual indicator.

FIG. 6 is a schematic view illustrating off-axis, tilt visual effect of the lens 510. As shown in FIG. 6, if the axis of the lens 510 is tilted off-angle relative to that of the video camera 100, then the spots 552, 554 will appear as separate spots. The virtual spot 554 will tend to remain near the center of the lens 510, while the other spot 552 will travel in a direction indicating the direction of tilt. As described above, movement of the first member 10 relative to the second member 11 housing the lens 510 will ultimately lead to coincidence of the respective axes and appearance of the single spot 550.

The front surface of the lens 510 can be mirrored slightly to improve the intensity of the virtual spot 554 with respect to the intensity of the reprojected spot 552. This lens 510 embodiment of the visual indicator 12 works exceptionally well even without the use of a laser; only a bright collimated light source is necessary, e.g., a spotlight.

Figure 7:
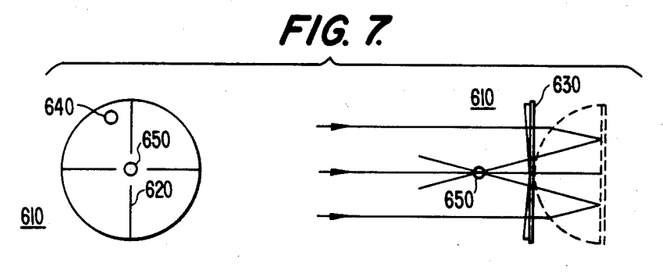
FIG. 7 is a schematic view of another alternate embodiment of the visual indicator of the present invention, illustrating particularly a fresnel lens with an on-axis representation.
Figure 8:
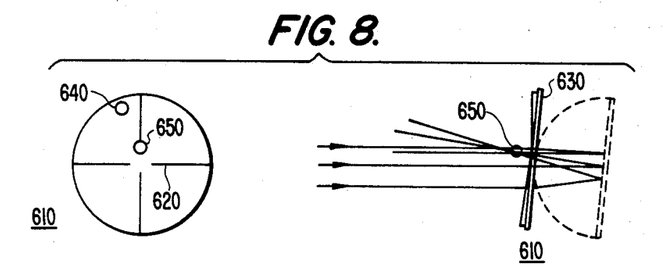
FIG. 8 is a schematic view of the alternate embodiment shown in FIG. 7 with an off-axis representation.

Another alternate embodiment of the visual indicator 12 is shown in FIGS. 7 and 8, i.e., a fresnel type lens 610. A fresnel lens is not actually curved, but gives a curved appearance. That is, a fresnel lens is basically a collapsed lens, but the optical model of a fresnel lens is a curviplanar. As a result, the operator will not see two dots on the fresnel lens, but will see only a single dot.

The single bright image which is seen is equivalent to the spot 554 which was moving around on the lens 510 shown in FIGS. 4–6. As a result, with the fresnel lens 610 the center thereof must be indicated with some sort of a visual reference, i.e., cross-shape 620 or pointers physically on the surface of the fresnel lens.

The function of the fresnel lens 610 is similar to that of the alternate embodiment lens 510 described above in relation to FIGS. 4–6. That is, FIG. 7 is a schematic view illustrating particularly a fresnel lens with an on-axis representation and FIG. 8 is a schematic view of the fresnel lens 610 shown in FIG. 7 with an off-axis representation. The cross-shape 620 and an index mark 640 are formed on the front surface of the fresnel lens 610, and a mirrored surface 630 is formed on the rear surface of the lens 610. Only a single spot 650 appears to be formed at the front of the fresnel lens 610, similar to spot 552 shown in FIG. 5.

When the optical axis of the fresnel lens 610 is aligned with the viewing axis of the video camera 100 shown in FIG. 1, the spot 650 will appear to be centered on the fresnel lens 610 as shown in FIG. 7. On the other hand, when the optical axis of the fresnel lens 610 is not aligned with the viewing axis of the video camera 100, the spot 650 will be off-center of the fresnel lens 610 and indicate the direction of off-axis tilt. As stated above, on-axis orientation can be accomplished by moving the first member 10 relative to the second member 11 via the control circuit.

An important consideration in determining whether to use a glass, curved lens 510 or a fresnel lens 610 is that the larger the aperture the wider the off-axis indication will be—it is linearly proportional. The larger the aperture, the greater area there is for displacing the two dots.

For manufacturing purposes, a fresnel lens 610 would probably be simpler to mount and protect than the glass lens 510. Because the fresnel lens 610 is essentially flat and inexpensive to make, it is attractive for many applications, except perhaps in the radiation of a nuclear powered steam generator. Thus, it is to be understood that each embodiment of the visual indicator 12 satisfies the goals of the present invention, even though one embodiment might be chosen over another for a particular application.

The foregoing is considered illustrative only of the principles of the invention. Further, since numerous modifications and changes will readily occur to those skilled in the art, it is not desired to limit the invention to the exact construction and operation shown and described. For example, the present invention could be used by, e.g., a welding robot to locate and accurately weld an area based on readings from a visual indicator located at or near the area to be welded. In addition, although the above-description emphasizes that the present invention is primarily intended as an aid to remote control of a machine by a human, this invention also contemplates control of the machine by computer means aided by the invention described herein, such as a control environment using computer vision feedback. Accordingly, all suitable modifications and equivalents may be resorted to, falling within the scope of the invention and the appended claims and their equivalents.

What is claimed is:

1. An apparatus for determining orientation of an axis of a first, movable member relative to an axis of a second member, comprising:

(a) reflective visual indicator means, fixed to the second and having a central axis aligned with an axis of the second member, for reflecting light;
    (b) a first light source fixedly connected to the first member, aligned with an axis of the first member and projecting a beam of light on the reflective visual indicator means;
    (c) visual means, connected to the first member, for detecting the beam of light reflected by the visual indicator means relative to the central axis of the visual indicator means; and
    (d) means for moving the first member relative to the second member to align the axes of the first and second members dependent upon the beam of light detected by the visual means,
    wherein the reflective visual indicator means includes:
        (i) a hollow cylinder, the internal walls of which are non-reflective,
        (ii) a mirror mounted on the back surface of the cylinder, perpendicular to the cylinder's axis of symmetry, and
        (iii) a light diffusing front surface mounted parallel to the mirror and having a small transparent window, a cross-shape and an index mark formed thereon, and
    wherein, when the beam of light from the first light source s the visual indicator means, first and second spots are seen with the visual means, and, if the optical axis of the visual indicator means is aligned with that of the visual means, the first and second spots appear to be superimposed and axial alignment of the first and second members is achieved and, if the first and second spots are not superimposed, axial alignment is not achieved.

2. The apparatus as recited in claim 1, wherein the cylinder depth to cylinder diameter ratio of the visual indicator means is approximately 1:1.

3. An apparatus for determining orientation of an axis of a first, movable member relative to an axis of a second member, comprising:

(a) reflective visual indicator means, fixed to the second member and having a central axis aligned with an axis of the second member, for reflecting light;
    (b) a first light source fixedly connected to the first member, aligned with an axis of the first member and projecting a beam of light on the reflective visual indicator means; and
    (c) visual means, connected to the first member, for detecting the beam of light reflected by the visual indicator means relative to the central axis of the visual indicator means,
    wherein the visual indicator means, includes a curved, glass lens with a cross shape and an index mark formed on the front surface thereof, and a rear mounted mirror, and
    wherein, when the beam of light from the first light source strikes the lens, first and second spots are seen with the visual means and, if the optical axis of the lens is aligned with that of the visual means, the first and second spots appear to be superimposed and axial alignment of the first and second members is achieved and, if the first and second spots are not superimposed, axial alignment is not achieved.

4. An apparatus for determining orientation of an axis of a first, movable member relative to an axis of a second member, comprising:

(a) reflective visual indicator means, fixed to the second member and having a central axis aligned with an axis of the second member, for reflecting light;
(b) a first light source fixedly connected to the first member, aligned with an axis of the first member and projecting a beam of light on the reflective visual indicator means; and
(c) visual means connected to the first member, for detecting the beam of light reflected by the visual indicator means relative to the central axis of the visual indicator means,
wherein the visual indicator means includes a fresnel lens having a cross-shape and an index mark formed on the front surface thereof and a mirror formed on the rear surface thereof, and
wherein, when the beam of light from the first light source strikes the fresnel lens, a single spot is seen with the visual means, and, if the optical axis of the fresnel lens is aligned with the viewing axis of the visual means, the spot appears to be centered on the fresnel lens surface and axial alignment of the first and second members is achieved, and if the spot is off-center of the fresnel lens, axial alignment is not achieved.

5. The apparatus as recited in claim 4 wherein the first light source comprises a laser.

6. An apparatus for determining orientation of a first axis of a first, movable member relative to a second axis of a second member, comprising:
(a) reflective visual indicator means, fixed to the second member, and having a central axis aligned with the second axis of the second member, for reflecting light;
(b) a first light source fixedly connected to the first member, aligned with the first axis of the first member and projecting a beam of light on the reflective visual indicator means; and
(c) visual means, connected to the first member, for detecting the beam of light reflected by the visual indicator means relative to the central axis of the visual indicator means,
wherein the first light source includes, in sequence, a laser beam, a beam expander, a beam expander lens template having a pattern, a mirror, a beam splitter and another mirror, all of which are operatively connected to the first member, and
wherein the laser projects the beam of light through the beam expander and the beam-expander lens template, giving the projected beam of light a well defined pattern which then reflects off of the former mirror and passes through the beam-splitter to be reflected off the latter mirror coincident with the first axis of the first member and coincidentally on-axis with the field of view of the visual means, and inverted to match the original orientation of the beam expander lens template pattern.

7. The apparatus as recited in claim 6, wherein the beam expander lens template creates a cross-shape beam of light.

8. An apparatus for determining orientation of an axis of a first, movable member relative to an axis of a second member, comprising:
(a) reflective visual indicator means, fixed to the second member and having a central axis aligned with an axis of the second member, for reflecting light;
(b) a first light source fixedly connected to the first member, aligned with an axis of the first member and projecting a beam of light on the reflective visual indicator means; and
(c) visual means, connected to the first member, for detecting the beam of light reflected by the visual indicator means relative to the central axis of the visual indicator means,
wherein the visual means includes
(i) a video camera mounted on the first member with its field of view centered on the axis of the second member, and
(ii) a second light source for illuminating the field of view of the video camera.

9. An apparatus for remotely aligning an axis of a first movable member relative to an axis of a second member by an operator, comprising:
(a) video camera mounted on the first member;
(b) a mirror located on the first member for gathering light from its field of view in front of the first member and reflecting the light at right angles;
(c) a beam splitter for receiving the light reflected from the mirror and reflecting the light at right angles to the video camera;
(d) a first light source attached to the first member, aligned with an axis of the first member and projecting a beam of light to the second member;
(e) a second light source for projecting light in the opposite direction that the light is being gathered by the mirror of the first member;
(f) a beam expander and beam expander lens template for receiving the beam of light from the first light source and giving the beam of light a defined pattern;
(g) a mirror for receiving the beam of light from the beam expander lens template and reflecting the beam of light through the beam splitter, which reflects the beam of light on-axis with the first member, coincidentally on-axis with the video camera's field of view, and inverting the beam of light to match the original orientation of the beam expander lens template's pattern; and
(h) a visual indicator mounted on the second member so that its optical axis is collinear with the axis of the second member, the visual indicator including:
(i) a hollow cylinder, with non-reflective internal walls,
(ii) a planar mirror mounted on the back surface of the cylinder perpendicular to the cylinder's axis of symmetry, and
(iii) a light diffusing front surface parallel to the mirror on the back of the cylinder, and having a small central transparent window, a cross-shape and an index mark formed on the front surface thereof,
wherein an off-axis rotation of the first member to the right o the operator's perspective will result in a spot appearing to the right of center on the front surface of the visual indicator,
wherein, an off-axis rotation of the first member to the left of the operator's perspective will result in a spot appearing to the left of center, and
wherein, if a spot is formed to appear exactly on axis with the center of the visual indicator, alignment of the axes of the first and second members is achieved.

* * * * *